US008725618B1

(12) United States Patent
Menzer et al.

(10) Patent No.: US 8,725,618 B1
(45) Date of Patent: May 13, 2014

(54) SYSTEM AND METHOD FOR DE-RISKING A PENSION FUND

(71) Applicant: Manulife Asset Management (US) LLC, Boston, MA (US)

(72) Inventors: Eric Menzer, Malden, MA (US); Konstantin Danilov, Jouy-en-Josas (FR); Joseph O'Connor, Quincy, MA (US); Paul Partridge, New Hamburg (CA); Alasdair Rew, Toronto (CA); Nadia Savva, Mississauga (CA); Steve Orlich, Toronto (CA); Steve Medina, Des Moines, IA (US); Bob Boyda, Sherborn, MA (US); Irina Muhina, Toronto (CA); Neal Toomey, Boston, MA (US)

(73) Assignee: Manulife Asset Management (US) LLC, Boston, MA (US)

( * ) Notice: Subject to any disclaimer, the term of this patent is extended or adjusted under 35 U.S.C. 154(b) by 0 days.

(21) Appl. No.: 13/672,997

(22) Filed: Nov. 9, 2012

(51) Int. Cl.
*G06Q 40/00* (2012.01)

(52) U.S. Cl.
USPC .......... 705/36 R; 705/35

(58) Field of Classification Search
CPC .......... G06Q 40/06; G06Q 40/00
USPC .......... 705/36 R, 35
See application file for complete search history.

(56) References Cited

U.S. PATENT DOCUMENTS

| | | | | |
|---|---|---|---|---|
| 6,055,517 | A | 4/2000 | Friend et al. | |
| 7,509,279 | B2 | 3/2009 | Chhabra et al. | |
| 7,895,102 | B1 | 2/2011 | Wilks et al. | |
| 8,185,464 | B1 * | 5/2012 | Ameriks et al. | 705/36 R |
| 2010/0010938 | A1 * | 1/2010 | Dundas et al. | 705/36 T |
| 2011/0161246 | A1 * | 6/2011 | Gottschalg | 705/36 R |
| 2012/0109699 | A1 * | 5/2012 | Hatfield | 705/7.12 |
| 2012/0246094 | A1 * | 9/2012 | Hsu et al. | 705/36 R |

OTHER PUBLICATIONS

Towers Watson, Assessing Funded Status Volatility, Pension Finance Watch: Special Analysis, 2011.

* cited by examiner

*Primary Examiner* — Jagdish Patel
(74) *Attorney, Agent, or Firm* — Dowell & Dowell, P.C.; Ralph A. Dowell

(57) ABSTRACT

A system for de-risking a pension fund, the system including: an input module for receiving asset class forecasts; a modeling module for modeling a plurality of portfolios based on the asset class forecasts to provide a de-risking framework; an asset mix module for receiving an asset mix for each of the model portfolios based on the de-risking framework; a database for storing data related to the asset class forecasts, the model portfolios, and asset mix; a processor configured to monitor the model portfolios for performance within the de-risking framework by: calculating an indicator of funded status volatility; comparing the indicator with a benchmark; and reporting the result. In particular, the indicator of funded status volatility is a liability tracking error and the benchmark is the liability tracking error of a conventional or standard pension portfolio.

18 Claims, 17 Drawing Sheets

SYSTEM AND METHOD FOR DE-RISKING A PENSION FUND

FIELD

The present disclosure relates generally to derisking a pension fund. More particularly, the present disclosure relates to systems and methods for de-risking pension funds based on a plurality of de-risking portfolios related to funded status.

BACKGROUND

Pension plan sponsors face challenges such as generating a sufficient return on assets to cover pension obligations, minimizing the frequency and the amount of contributions required over the life of the plan, and minimizing the key risks to a fund: equity risk and interest rate risk. Equities are subject to equity market risk due to regular fluctuations in stock prices but tend to have greater potential for higher returns. On the other hand fixed income instruments tend to be somewhat more stable but can be sensitive to interest rate risk due to changes in interest rates over time. Plan liabilities in defined-benefit plans are typically uncorrelated with movements in equities but can be sensitive to interest rate movements due to low interest rates magnifying the present value of future liabilities.

Conventional methods of managing pension portfolios generally involve either simple "rules of thumb", such as the 60/40 equities/fixed income rule, or very complex reviews and analysis that can be time consuming and costly.

It is, therefore, desirable to provide an improved system and method for managing and, in particular, de-risking pension funds.

SUMMARY

It is an object of the present disclosure to obviate or mitigate at least one disadvantage of conventional methods and systems for managing pension portfolios.

According to an aspect herein, there is provided a method for de-risking a pension fund, the method including: developing asset class forecasts; modeling a plurality of portfolios based on the asset class forecasts to provide a de-risking framework; determining asset mix for each of the model portfolios based on the de-risking framework; and monitoring the model portfolios for performance within the de-risking framework by: calculating an indicator of funded status volatility; and comparing the indicator with a benchmark.

The use of a plurality of model portfolios allows a pension fund manager to choose a portfolio based on their current funded status while the use of an indicator and benchmark related to funded status volatility provides a measure of the ability of the portfolios to track liabilities rather than just measuring or comparing returns.

In a particular case, the method may further include back-testing the model portfolios against historical data. Back-testing provides further verification that the portfolio will operate appropriately in tracking liabilities and reducing volatility.

In order to reduce complexity, the plurality of portfolios may include 10 or fewer portfolios, 6 or fewer portfolios. Further, the plurality of portfolios may include at least one portfolio for under-funded status and at least one portfolio for over-funded status.

In another particular case, the indicator includes a liability tracking error based on comparing the portfolio with a liability proxy. In this case, the benchmark may be the liability tracking error of a standard pension portfolio.

In yet another case, the de-risking framework may include providing portfolios for a plurality of funded status levels. In this case, the plurality of funded status levels may include: 80%, 90%, 100% and 105% funded status. Further, there may be additional portfolios at one or more of these levels that are provided to allow for differential approaches within a level. It may also be possible for a pension fund manager to put a portion of the pension fund into multiple portfolios to obtain a "blended" result.

According to another aspect herein, there is provided a system for de-risking a pension fund, the system including: an input module for receiving asset class forecasts; a modeling module for modeling a plurality of portfolios based on the asset class forecasts to provide a de-risking framework; an asset mix module for receiving an asset mix for each of the model portfolios based on the de-risking framework; a database for storing data related to the asset class forecasts, the model portfolios, and asset mix; a processor configured to monitor the model portfolios for performance within the de-risking framework by: calculating an indicator of funded status volatility; comparing the indicator with a benchmark; and reporting the result.

In a particular case, the system may further include a back-testing module for back-testing the model portfolios based on historical data.

In order to reduce complexity, the plurality of portfolios may include 10 or fewer portfolios, 6 or fewer portfolios. Further, the plurality of portfolios may include at least one portfolio for under-funded status and at least one portfolio for over-funded status.

In another particular case, the indicator includes a liability tracking error based on comparing the portfolio with a liability proxy. In this case, the benchmark may be the liability tracking error of a standard pension portfolio.

In yet another case, the de-risking framework may include providing portfolios for a plurality of funded status levels. In this case, the plurality of funded status levels may include: 80%, 90%, 100% and 105% funded status.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 10 is a chart illustrating back-testing of annualized funded status volatility for the 60/40 TSX/DEX portfolio vs. the 90% funded portfolio;

DETAILED DESCRIPTION

Generally, the present disclosure provides methods and systems for managing pension fund portfolios to de-risk the fund. Prior to introducing the methods and systems, it is useful to describe some of the background that lead to the identification of the problem with conventional systems and the eventual development of the methods and systems described herein.

Figure 1:
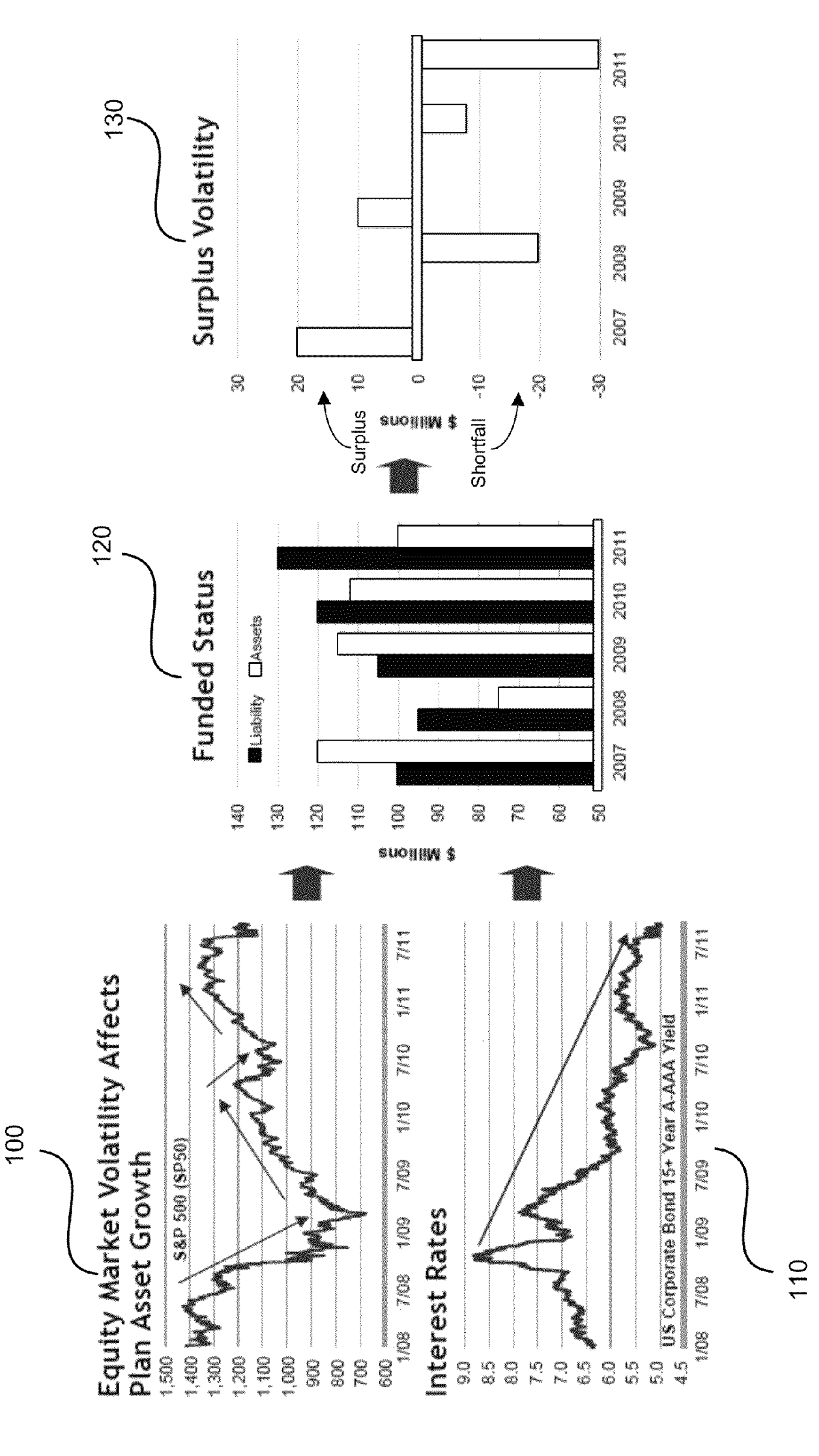
FIG. 1 illustrates traditional funded status volatility.

FIG. 1 illustrates traditional funded status volatility. Funded status volatility is caused by equity market volatility 100 and fluctuations in interest rates 110. Equity market volatility 100 impacts plan asset growth. Lower interest rates 110 decrease plan asset growth and can also increase plan liabilities. The funded status 120 for a particular fund (e.g. a pension fund) thus changes over time based on interest rates and equity market volatility. The volatility in the funded status 130 may create a funding surplus some years and a funding shortfall other years.

Figure 2:
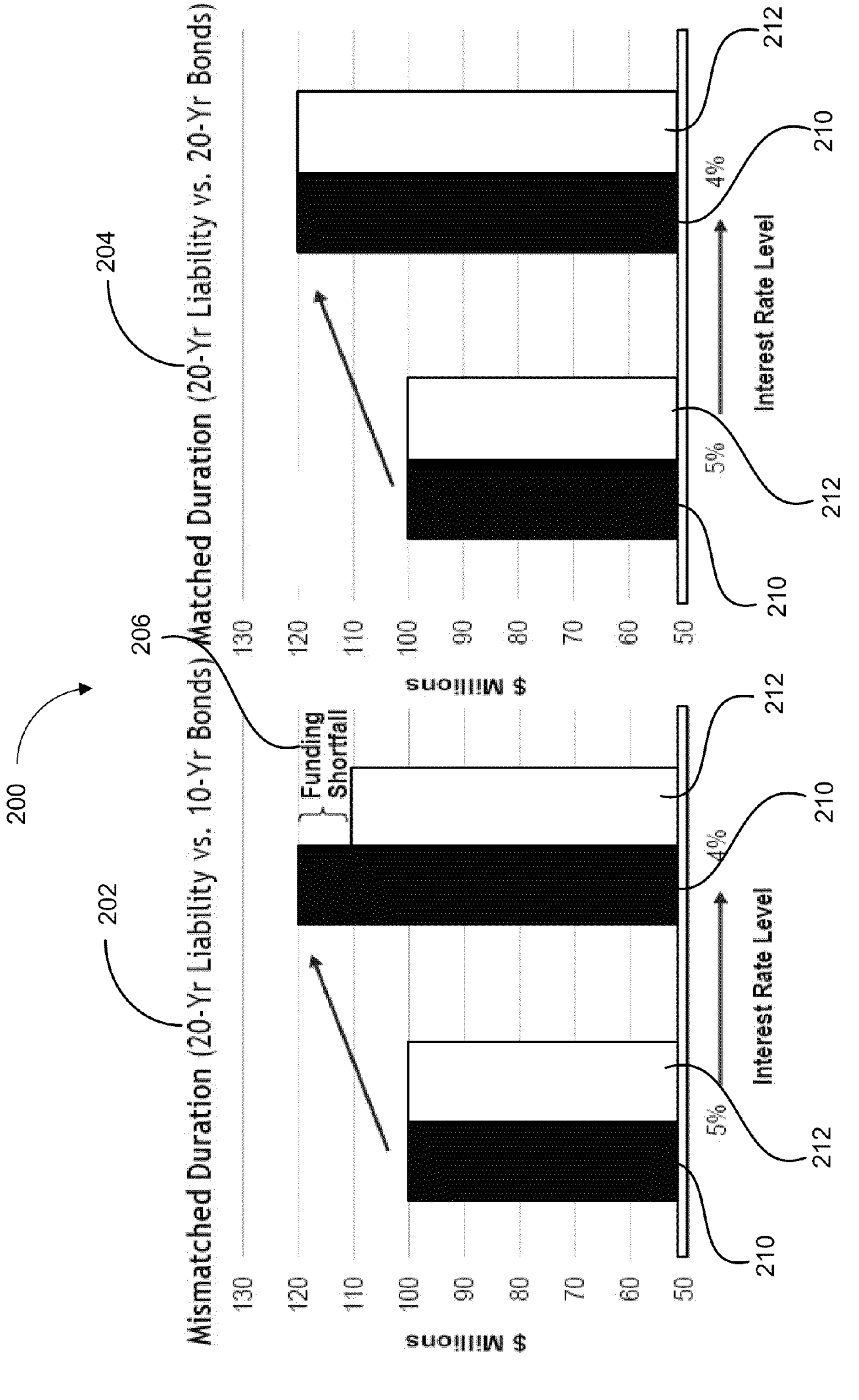
FIG. 2 illustrates interest rate impact on plan liabilities.

FIG. 2 illustrates interest rate impact on plan liabilities 200. As a starting point, a fund (e.g. a pension fund) has liabilities 210 and assets 212 that are equal (i.e. fully funded) and assuming that the assets 212 are composed of 100% of fixed income. In this scenario, the general interest rate will fluctuate and if the interest rate is lower, there may be a funding shortfall 206. FIG. 2 also illustrates how the duration of assets and liabilities will also impact the sensitivity to changes in interest rates. If the duration of assets 210 and liabilities 212 is mismatched 202, a decreasing interest rate will result in a funding shortfall 206. If the duration of assets 210 and liabilities 212 is matched 204, a decreasing interest rate will generally not result in a funding shortfall.

Figure 3A:
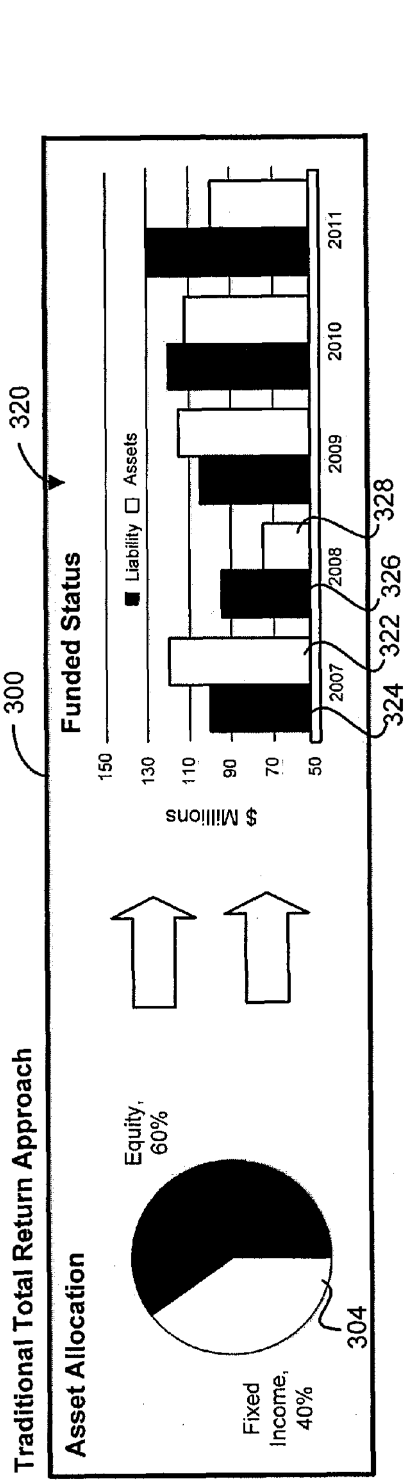
FIGS. 3A and 3B illustrate a traditional return approach and a liability driven approach, respectively.

FIG. 3A illustrates a traditional total return approach 300 to managing a a pension fund. Traditional total return approach 300 is focused on maximizing total return with little regard for plan liabilities. The traditional total return approach 300, may comprise, for example, a set asset allocation 310 of 60% equity 302 and 40% fixed income 304. The traditional total return approach 300 has a funded status 320 that can fluctuate from year to year. In one year, (e.g. 2007) there may be more assets 322 than liabilities 324, in the next year (e.g. 2008) there may be about the same level of liabilities 326 but a lower value of assets 328. Thus, the funded status 320 fluctuates over time.

Figure 3B:
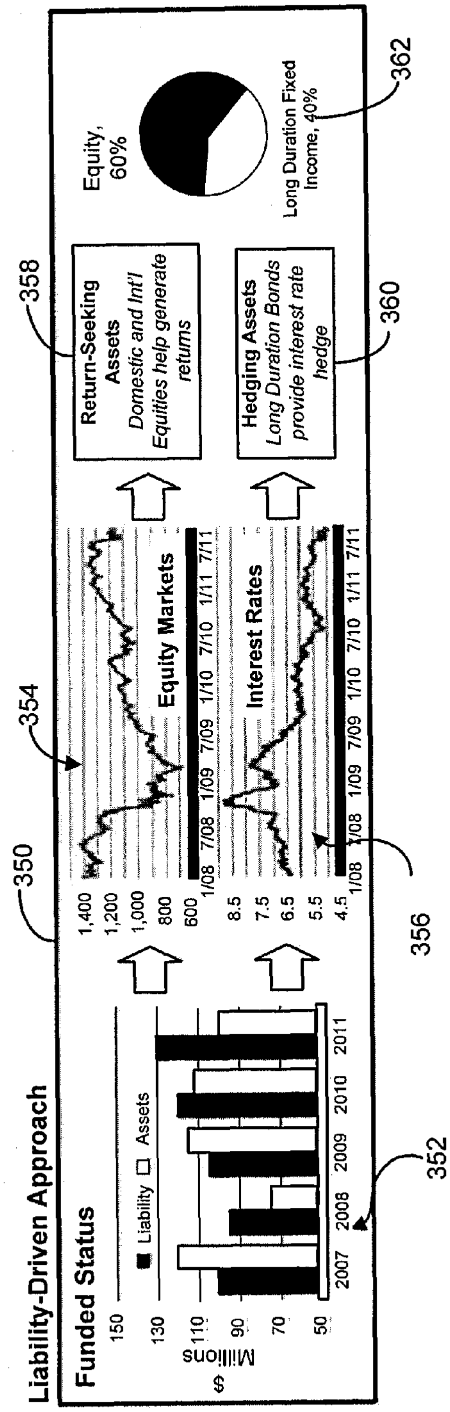

FIG. 3B illustrates a conventional liability driven approach 350. The liability driven approach 350 uses a mix of hedging assets and return seeking assets to attempt to receive maximum returns while minimizing funded status volatility, that is, while protecting against downside risk. In this example, the fund includes return-seeking assets 358, such as, domestic and international equities, which are intended to maximize return, and hedging assets 360, such as long duration bonds, which provide interest rate hedging. The asset allocation 362 of the liability driven approach may be 60% equity and 40% long duration fixed income.

Figure 4:
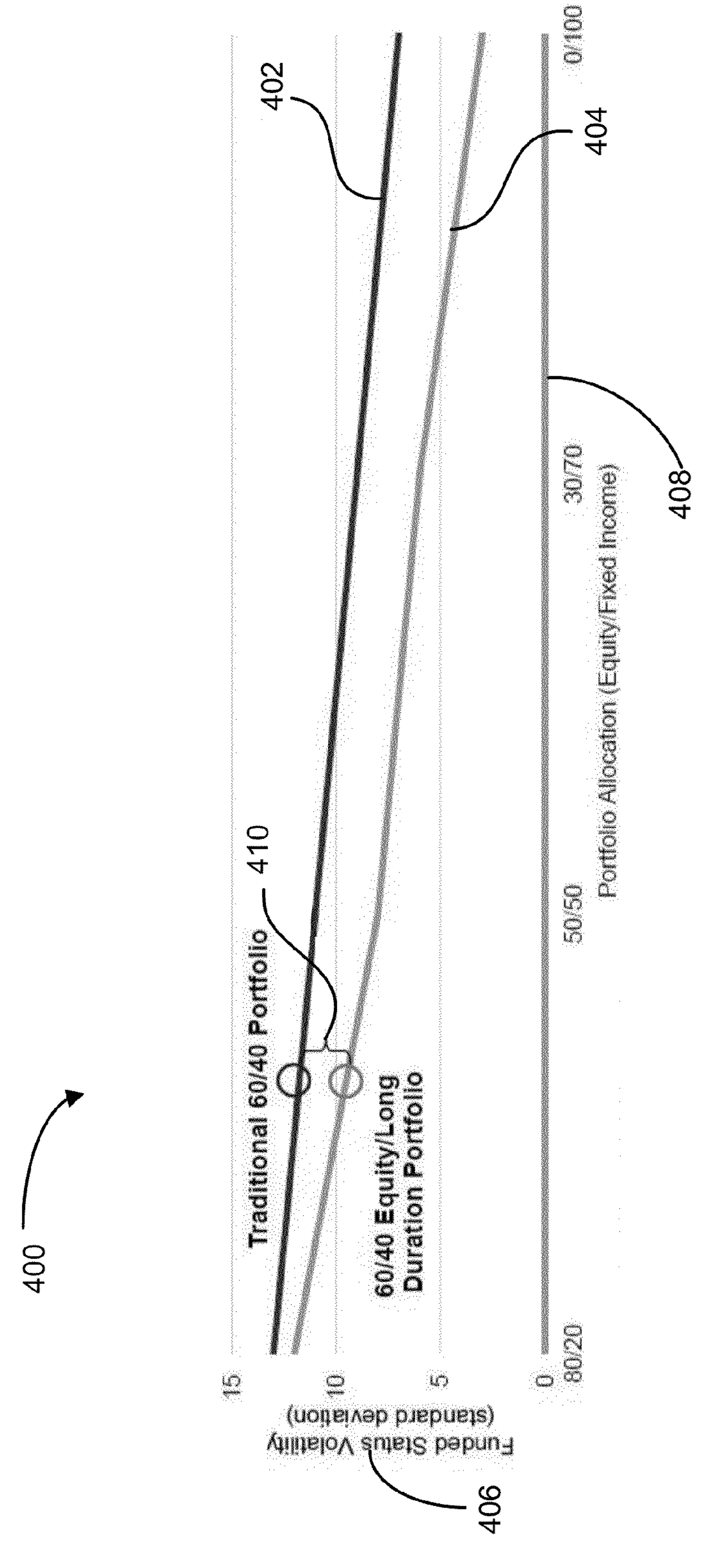
FIG. 4 illustrates a role of hedging assets in the liability driven approach.

FIG. 4 illustrates a role of hedging assets in the liability driven approach. Chart 400 compares funded status volatility for the total return approach 300 of FIG. 3A 402 and the liability driven approach 350 of FIG. 3B 404. The circled areas on the chart show a traditional 60/40 portfolio and a 60/40 equity/long duration portfolio. The funded status volatility 406 (standard deviation) falls as the portfolio allocation 408 moves to higher levels of fixed income because fixed income assets move more in step with liabilities due to their sensitivities to interest rates. Further, since liabilities in pension funds tend to be longer term, there is a potential reduction 410 in funded status volatility from the addition of longer duration fixed income assets.

Figure 5:
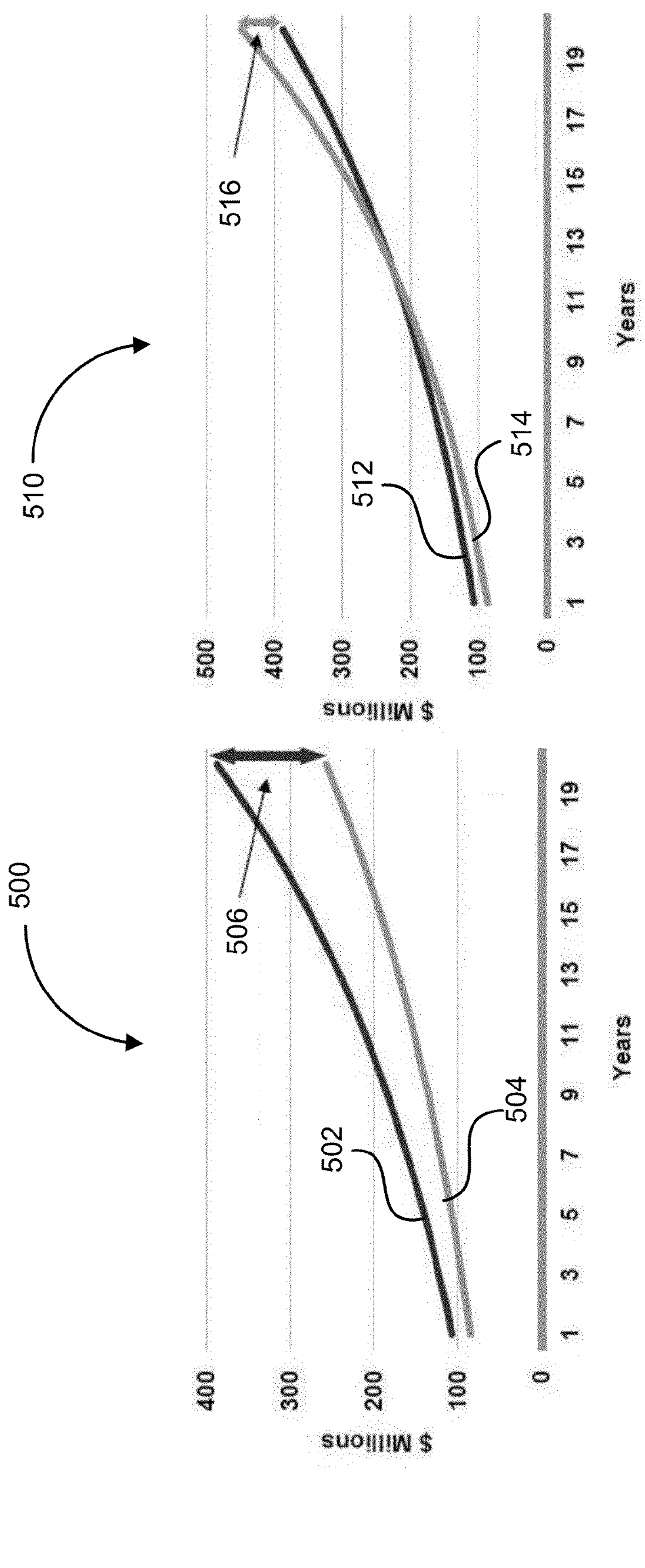
FIG. 5 illustrates a role of return-seeking assets in the liability driven approach.

FIG. 5 illustrates a role of return-seeking assets in the liability driven approach. Charts 500, 510 illustrate asset and liability growth. Charts 500, 510 assume that no further contributions are made over the duration of the plan. Chart 500 illustrates a portfolio of 100% long duration fixed income with initial liabilities 502 of $100 million and assets 504 of $80 million. At 19 years, the portfolio 500 will likely have a funding shortfall 506 because the durations of liabilities 502 and assets 504 and their sensitivities to interest rates cannot generally be matched exactly and also due to the lack of equity exposure. Chart 510 illustrates a portfolio of 60/40 equity/long term duration fixed income with initial liabilities 512 of $100 million and assets 514 of $80 million. At 19 years, the portfolio 510 will likely have a funding surplus 516 because of the anticipated better returns of the equity markets. Return-seeking assets are intended to increase the probability of hitting the funding target and lowering future contributions, but at the cost of increased funded status volatility (as seen in FIG. 4).

The issue that hasn't been identified in each of the total return and liability driven approaches, as well as in complex, detail plans for de-risking funds, is that the primary goal of the pension fund should be to match assets to liabilities in such a way that funded status volatility is controlled based on the actual funded status. The following description outlines improved methods and systems for managing and de-risking pension funds.

Figure 6:
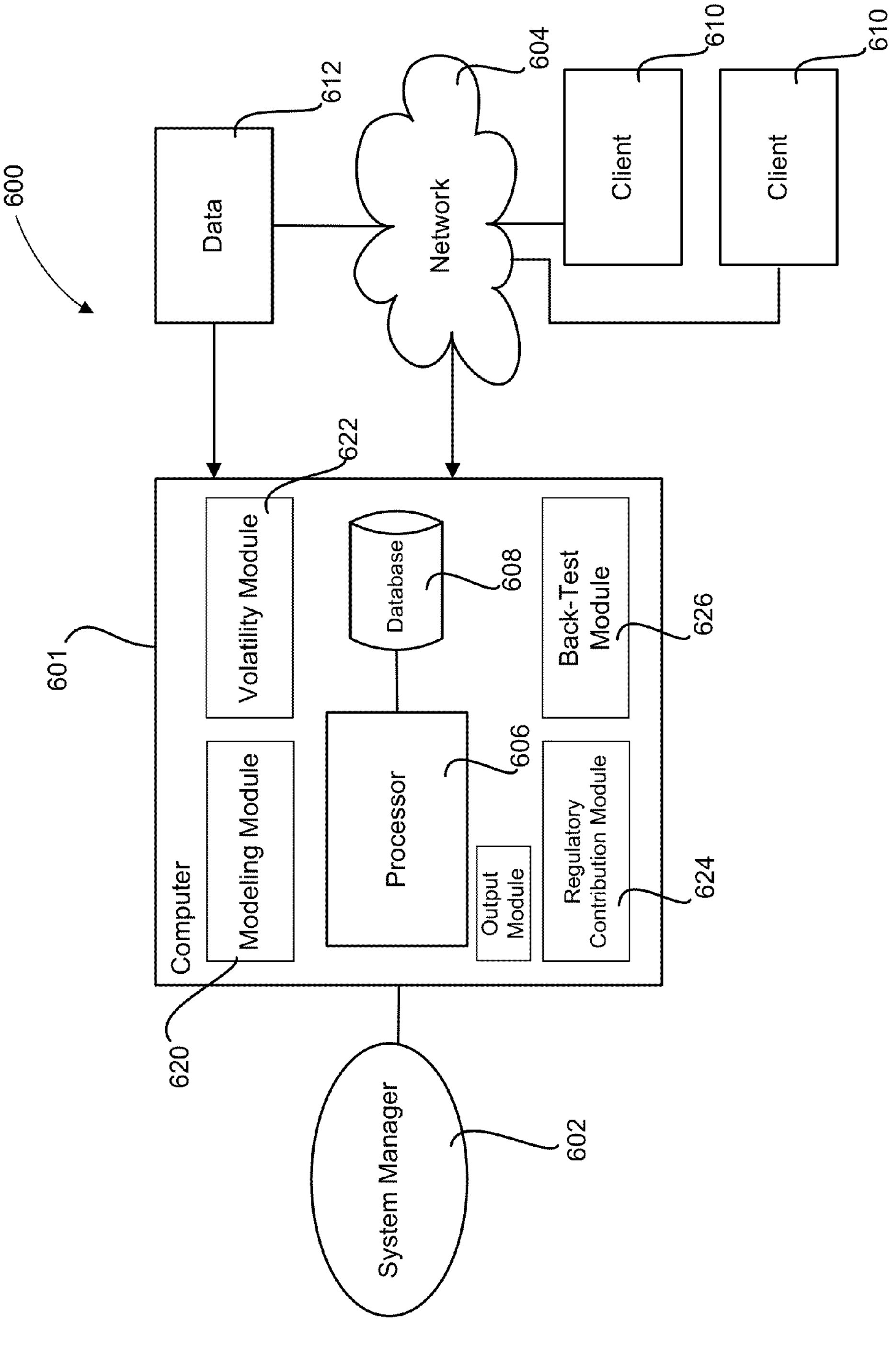
FIG. 6 is an embodiment of a system for managing and de-risking pension funds.

FIG. 6 illustrates an embodiment of a system 600 for managing and de-risking pension funds. System 600 includes a computing device/computer 601 and a system manager 602. Computer 601 is operable to receive instructions from at least one system manager 602. System manager 602 may be, for example, a portfolio fund manager. It will be understood that computer 601 may be a single computer or may be a network of computers, either local or distributed.

Computer 601 is connected to a network 604, such as, for example, the Internet, and via the network 604 connected to one or more client users 610 and databases 612. Network 604 allows client users 610 to interact/send/receive data with computer 601. Database 612 may store, for example, financial data relating to pension fund assets and liabilities. As shown in FIG. 6, database 612 may also be directly accessible by computer 601. Databases 612 may include proprietary databases of financial data, amortization databases, and the like.

Computer 601 includes a processor 606, an internal database 608, a modeling module 620, a volatility module 622, a regulatory contribution module 624, a back-test module 626, and an output module 628. Processor 606 regulates the flow of data among the modules and can be used by the modules when needed. In some cases, each module may have its own processor (not shown) instead of or as well as the option of using processor 606. The nature and function of each of the modules will be described in relation to FIG. 7.

Figure 7:
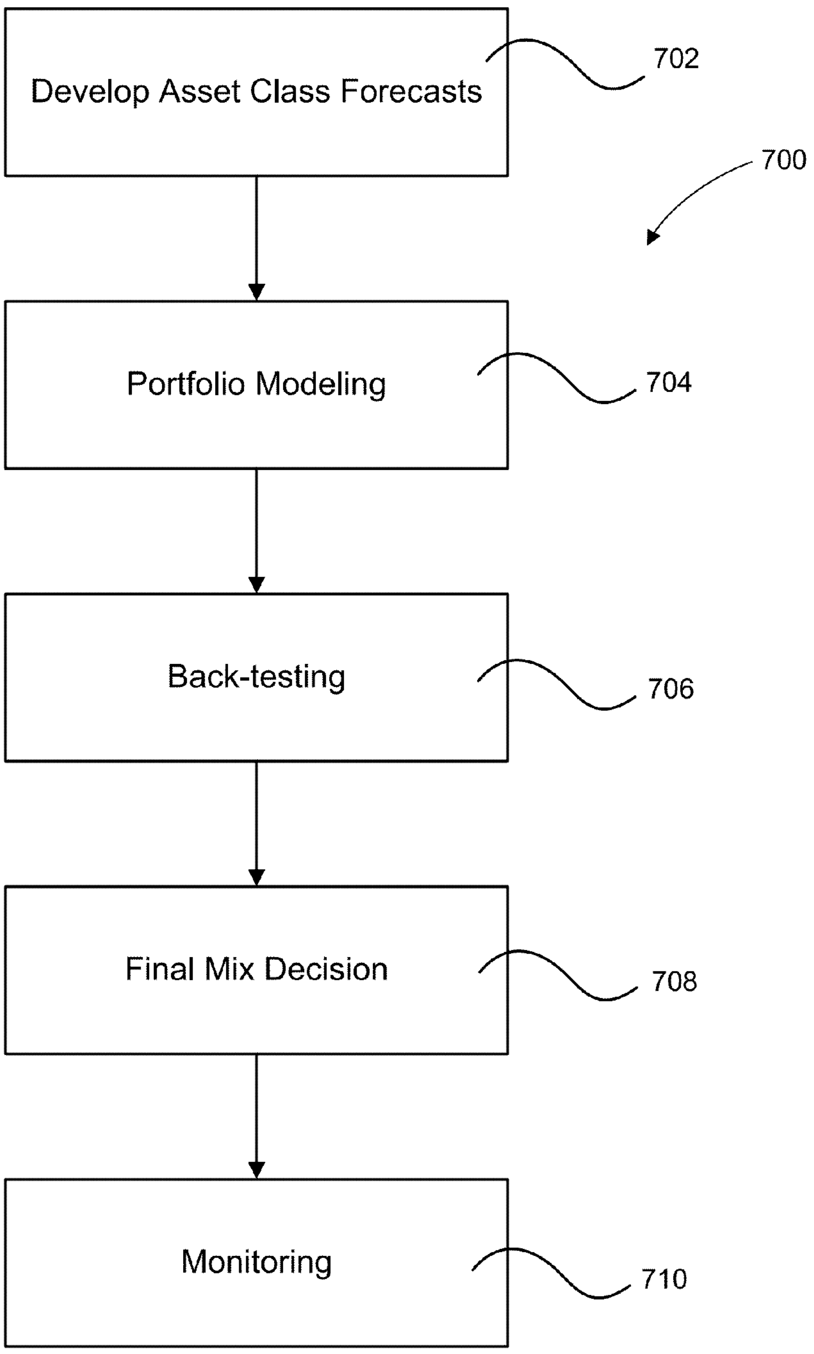
FIG. 7 is an embodiment of a method for de-risking investment funds.

FIG. 7 illustrates an embodiment of a method 700 for managing and de-risking pension funds. Method 700 may be implemented by a system, for example, the system 600 of FIG. 6.

At 702, an asset class forecast is developed. The asset class forecast projects the forward-looking expected returns for a time horizon. The time horizon may be, for example, 10-years but could also be any number of years within the range of, for example, 5-15 years, as appropriate. The asset class forecast will typically be developed or obtained by system manager 602 and input into internal database 608 of computer 601.

At 704, modeling module 620 models one or more de-risking portfolios. Modeling module 620 utilizes historical risk values and correlations as well as the asset class forecasts as inputs to optimize de-risking portfolios (described in further detail below). Modeling module may also receive regulatory contribution requirements from regulatory contribution module 624 to be incorporated into the analysis. The regulatory contribution requirements are provided to the regulatory contribution module 624 based on information published or otherwise made available by governmental authorities such as the Canadian Revenue Agency (Canada) or the Internal Revenue Service (United States) or the like.

At 706, back test module 626 back-tests the de-risking portfolios. In back-testing, back test module 626 uses data received from volatility module 622. Volatility module 622 analyzes the historical absolute and relative funded status volatility metrics for each de-risking portfolio. Back test module 626 then uses this data to examine several client experience scenarios through various market cycles. In some embodiments, back test module and back testing may not be required and only forward looking data may be used, however, back test data may provide additional information for determining the de-risking framework and asset mix for the portfolios.

At 708, the system manager 602 reviews the de-risking framework and data available, including back test data where available, and determines a final mix allocation for entry into database 608 of computer 601. The final mix allocation for each de-risking portfolio is based on various factors, including the quantitative results from 706, practical constraints, investor preferences, and a general view of the current market environment. The goal is to attempt to balance the benefits of active fixed income management and low-cost passive equity management. The system 600 and system manager 602 then allocate capital to the final asset mix and implements transactions needed to obtain the final asset mix. The transactions may be conducted via network 604 or in any of various ways for executing financial/market based transactions that are now known or become known.

At 710, each de-risking portfolio, and in particular, the asset mix, is then monitored regularly, and ideally continuously. During monitoring, system 600 monitors the absolute and relative funded status volatility measures (via volatility module 622) for each de-risking portfolio and may make asset allocation (asset mix) decisions based on on-going review as noted above and/or based on the current positioning of the de-risking portfolios and market environment. Further, the method 700 may also be re-run periodically, for example, annually, to re-adjust the portfolios based on the principles herein.

Figure 8:
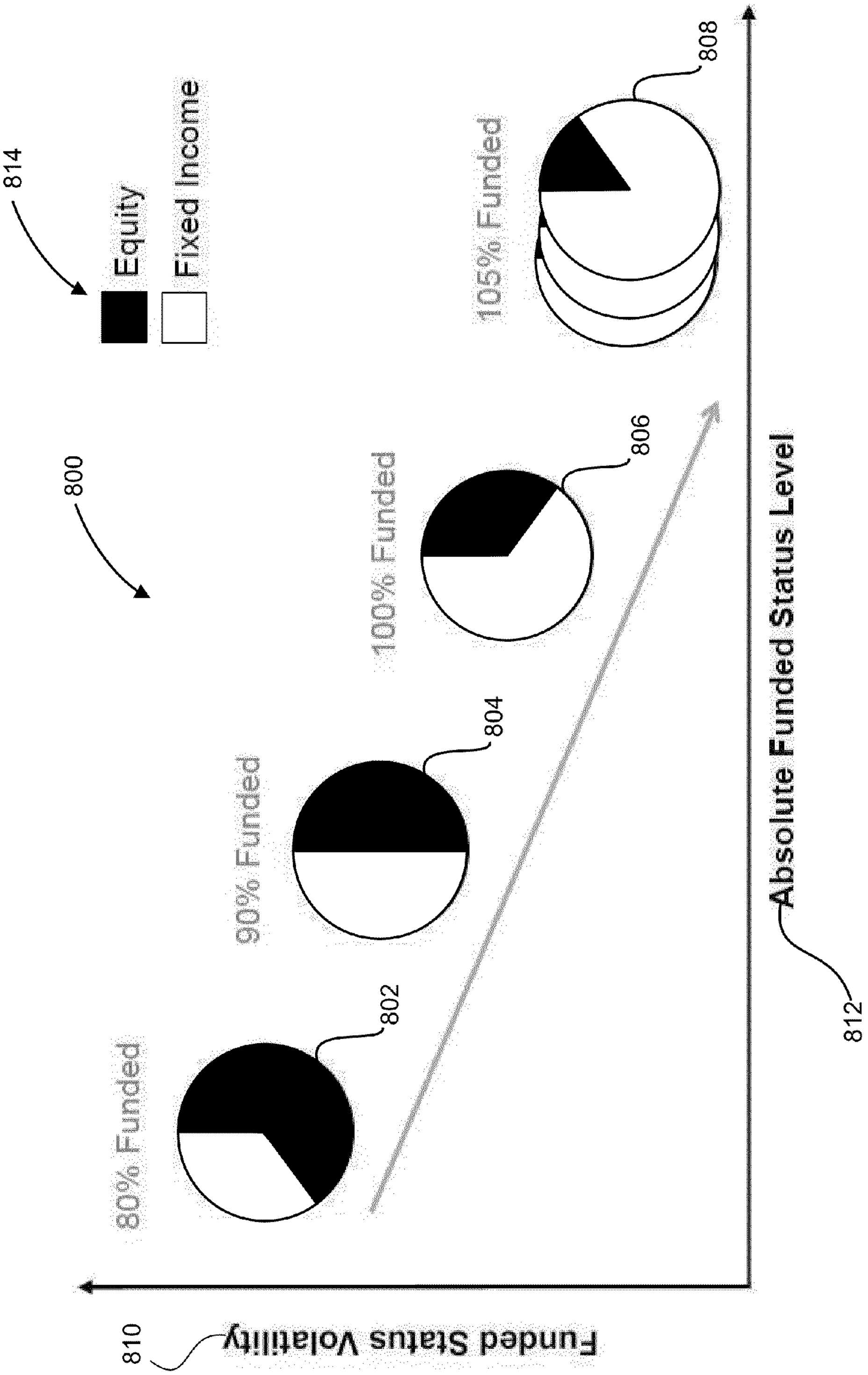
FIG. 8 is a chart illustrating funded status volatility vs. absolute funded status level for various target de-risking portfolios.

FIG. 8 is a chart 800 illustrating an example of various de-risking portfolios that provide a de-risking framework that may be generated via the method of FIG. 7. In this example, the de-risking portfolios include an 80% funded portfolio 802, a 90% funded portfolio 804, a 100% funded portfolio 806, and a 105% funded portfolio 808. In this example, there is actually a plurality of 105% funded portfolios. As shown in FIG. 8, each of the de-risking portfolios 802, 804, 806, 808 is configured such that the funded status volatility 810 will be reduced for higher absolute funded status levels.

The various de-risking portfolios are intended to create a step-wise de-risking program to help funds, e.g. pension funds/plans, attain a higher funded status and reduce their funded status volatility over time. The goal of each individual de-risking portfolio (802, 804, 806, 808) is to reduce funded status volatility 810 for a given funded status level 812 while maintaining an appropriate level of equity exposure. The group of individual de-risking portfolios can be considered a fund of funds solution configured to provide plan sponsors with a vehicle to reduce funded status volatility for their pension funds. It will be understood that there may be any appropriate number of portfolios in the de-risking framework, however, as one of the goals is to limit complexity, some embodiments may have 10 or fewer portfolios, 6 or fewer portfolios, 3 or fewer portfolios, or some included integer number of portfolios. In particular, there will generally be at least one portfolio of under funded status and one for over funded status.

Figure 9:
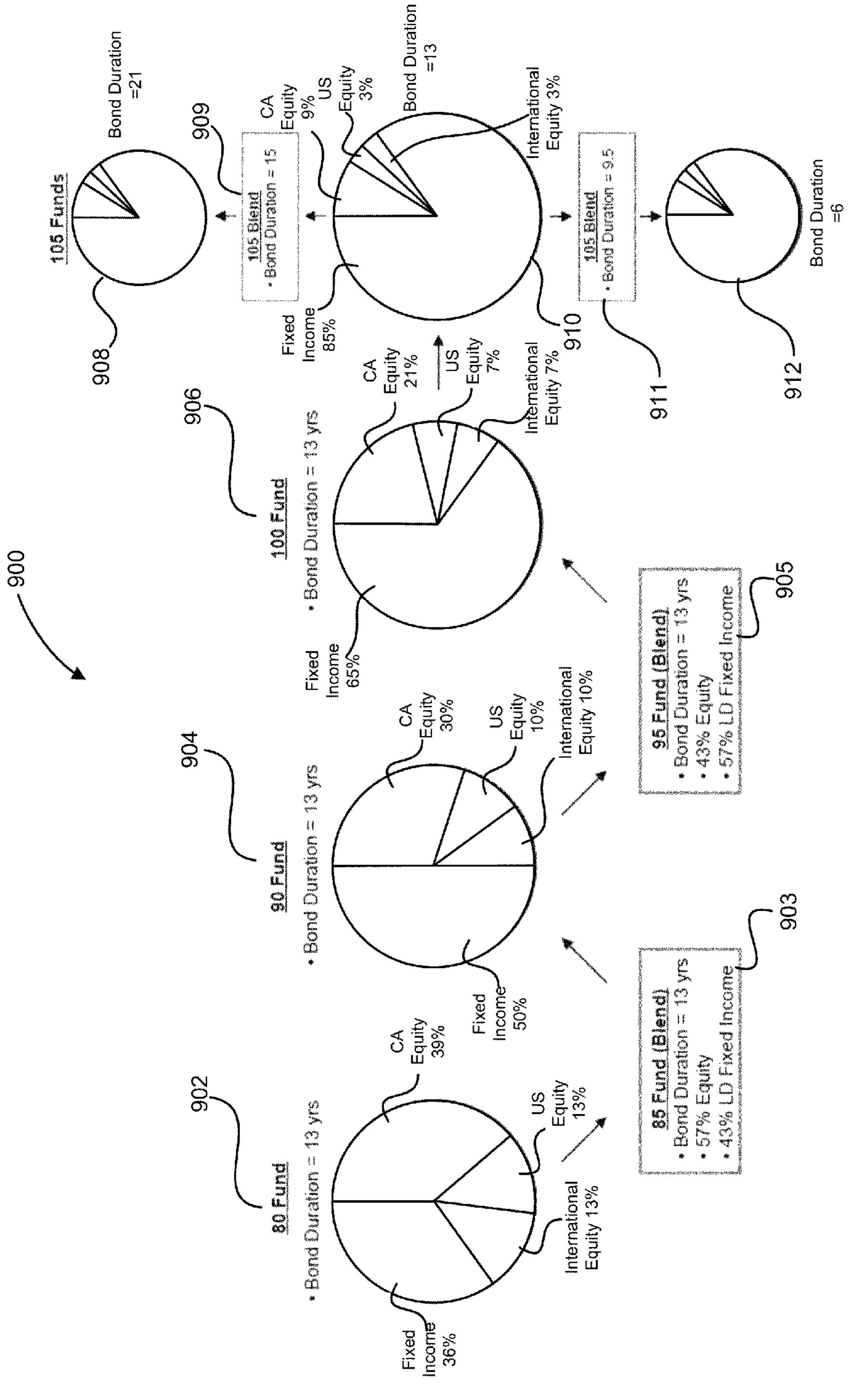
FIG. 9 illustrates a suite of de-risking portfolios similar to those of FIG. 8.

FIG. 9 illustrates a more detailed example suite of de-risking portfolios 900 similar to that shown in FIG. 8. Portfolio suite 900 has an 80% funded portfolio 902, a 90% funded portfolio 904, a 100% funded portfolio 906, and a plurality of 105% funded portfolios 908, 910, 912. As shown in FIG. 9, the suite of de-risking portfolios may include blended portfolios which blend the characteristics of two adjacent de-risking portfolios. These blended portfolios are shown as 85 blend 903, 95 blend 905, 105 blend A 909, and 105 blend B 912. While there could theoretically be a string of de-risking portfolios for every funded status percentage, the approach taken is intended to reduce complexity and computational requirements and provide an easy to implement and low cost solution for de-risking.

Each portfolio 902, 904, 906, 910 consists of an asset mix selected as noted above that corresponds to an appropriate funded range between 80% (or less) and 105% (or more). As a part of monitoring 710, the plan sponsors can monitor funded status level for their pension funds and then select portfolios (i.e. 80%, 90% or the like) according to the funded status. At the same time, the portfolio manager or system manager 602 is responsible for monitoring and managing the funded status risk/funded status volatility within each portfolio by using the volatility module 622.

In the example of FIG. 9, the 105% funded portfolio has three varieties 908, 910, 912 and two blended varieties 909, 911. These are intended to allow for more accurate liability hedging based on the time-frames of the liabilities and further reduce funded status volatility when at the 105% funded status. In this case, 105% funded portfolio 908 has a bond duration of 21 years, 105% funded portfolio 910 has a bond duration of 13 years, and 105% funded portfolio 912 has a bond duration of 6 years. Blended 105% funded portfolio 909 has a bond duration of 15 years and blended 105% funded portfolio 911 has a bond duration of 9.5 years.

Further, in this suite of de-risking portfolios (de-risking framework), the equity allocation may be configured to make use of passive strategies to minimize costs and eliminate active management risk. Examples of passive strategies may include, for example, Index funds such as the S&P 500 TSX™ or EAFE™.

System 600, method 700 and portfolio suites 800, 900 are intended to provide a de-risking framework that is an alternative to the traditional 60/40 balanced fund approach or the customized long duration fixed income (LDI) approach. In particular, the approach described herein is intended to overcome an issue with the customized long duration fixed income allocation, which is actively managed due to the inefficient nature of that sector of the bond market and to minimize the impact of adverse credit events. Further, the approach herein is intended to provide a high level of transparency.

One of the issues in monitoring the de-risking portfolios 710 is determining how to know if the asset mix in the de-risking portfolio is on track or performing as desired. While some conventional performance benchmarks are available, these conventional performance benchmarks (for example, performance against top-funds) neither measure the management team's ability to deliver on its objective of tracking liabilities nor align the goals of both the management team and the client. As noted above, most benchmarks track returns either absolute or compared to an index or other portfolios.

An improved benchmark should attempt to provide an objective measure of the portfolio's (e.g. the portfolios 902, 903, 904, 905, 906, 908, 909, 910, 911, 912 of FIG. 9) ability to reduce funded status risk and should attempt to capture three effects (1) the change in asset levels, such as portfolio returns; (2) the change in liability levels, such as liability returns; and (3) the correlation between assets and liabilities. It is proposed that a benchmark that tracks funded status volatility would satisfy these requirements.

In order to provide such a benchmark, a liability tracking error (LTE) is calculated for each portfolio against a liability proxy. In particular, the return for the portfolio is compared to the return for the liability proxy. The liability proxy, may be, for example the Canadian Long Term Government Bond Index, US Long Term Corporate Bond Index, or the like. The LTE measure is believed to be analogous to a funded status measure for a pension plan, indicating how closely the returns of the plan assets are tracking the liability returns. The LTE is intended to satisfy the requirements above.

An appropriate benchmark can then be created by comparing the LTE of each de-risking portfolio to the LTE of a standard pension portfolio. As an example, the standard portfolio may be the 60/40 TSX/DEX™ portfolio or index. A lower LTE measure for each of the de-risking portfolios would then be indicative of success.

Figure 10:
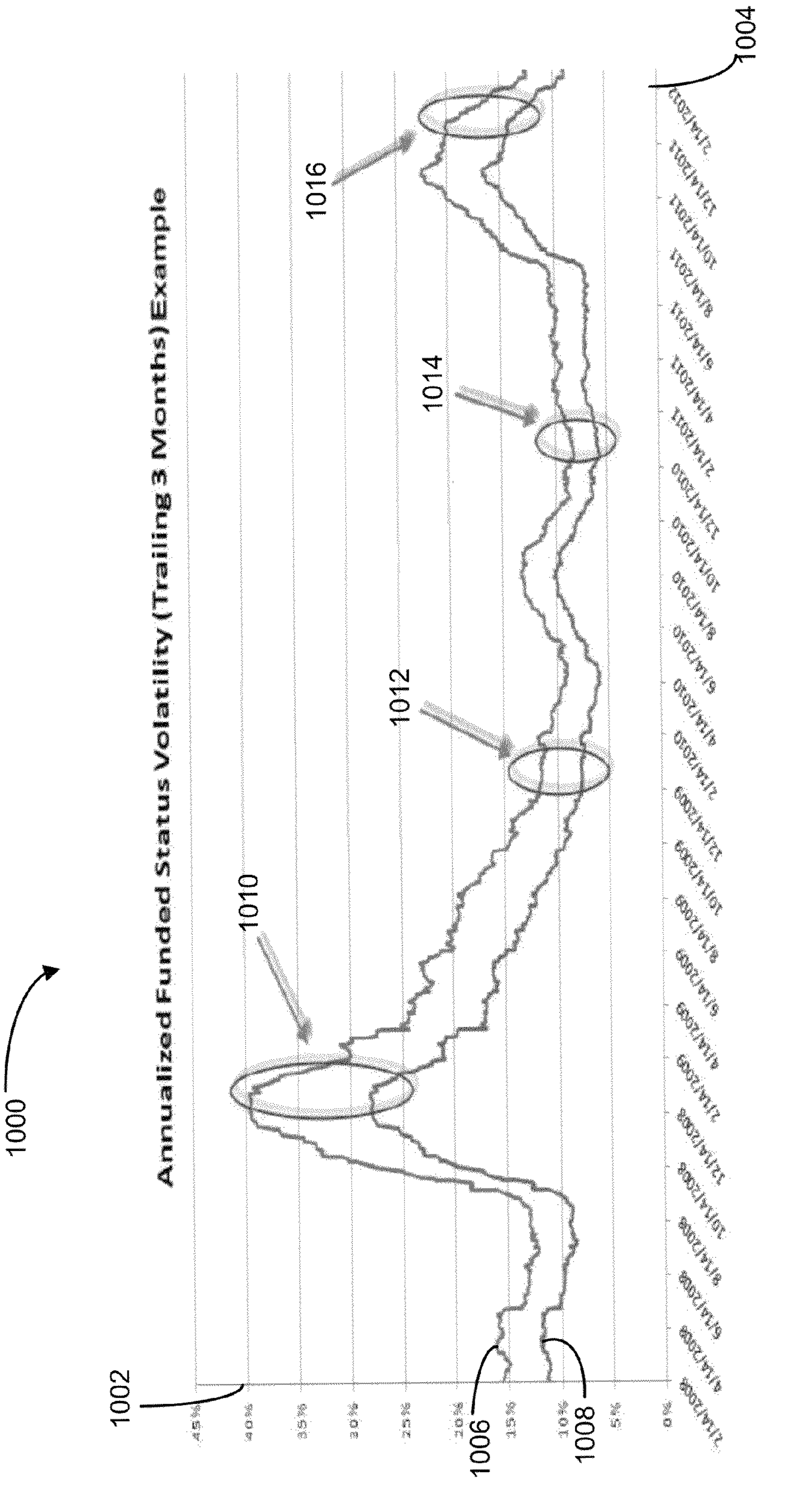
FIG. 10 is

FIG. 10 is a chart illustrating annualized funded status volatility for the 60/40 TSX/DEX portfolio 1006 vs. the 90% funded portfolio 1008. This provides a historical funded status volatility back test for Oct. 30, 2007 to Mar. 7, 2012. At 1010, time Dec. 31, 2008, the funded status volatility for the standard portfolio 1006 is 39.51% and the funded status volatility for the 90 fund 1008 is 27.97%—i.e. 70.8% of the standard portfolio. At 1012, time Dec. 31, 2009, the funded status volatility for the standard portfolio 1006 is 11.46% and the funded status volatility for the 90 fund 1008 is 7.58%-66.1% of the standard portfolio. At 1014, time Dec. 31, 2010, the funded status volatility for the standard portfolio 1006 is 8.21% and the funded status volatility for the 90 fund 1008 is 5.78%-70.4% of the standard portfolio. At 1016, time Dec. 31, 2011, the funded status volatility for the standard portfolio 1006 is 19.99% and the funded status volatility for the 90 fund 1008 is 14.22%-71.1% of the standard portfolio. Over the entire time 1004, the funded status volatility for the standard portfolio 1006 is 17.72% and the funded status volatility for the 90 fund 1008 is 12.51-70.6% of the standard portfolio. In the above, the funded status volatility is calculated as the standard deviation of the difference of asset returns less liability returns.

Using the same historical funded status volatility back test for Oct. 30, 2007 to Mar. 7, 2012 for the other de-risking portfolios of FIG. 9 provides the following results for funded status volatility: for the 80 fund (for example, the 80% fund 902 of FIG. 9)—16.25%; for the 90 fund (for example, the 90% fund 904 of FIG. 9)—12.51%; for the 100 fund (for example, the 100% fund 906 of FIG. 9)—8.87; for the 105 fund (for example, the 105% fund 910 of FIG. 9)—4.23%. As the funds transition from 80 fund to 90 fund to 100 fund to 105 fund the risk decreases. The relative funded status volatility, compared to the traditional 60/40 fund (that is, funded status volatility of 17.72%) is 92%, 71%, 50%, and 24% respectively for the 80 fund, 90 fund, 100 fund, and 105 fund. These relative funded status volatilities (as determined, for example, by LTE) can be used to determine a target range for each fund.

Figure 11:
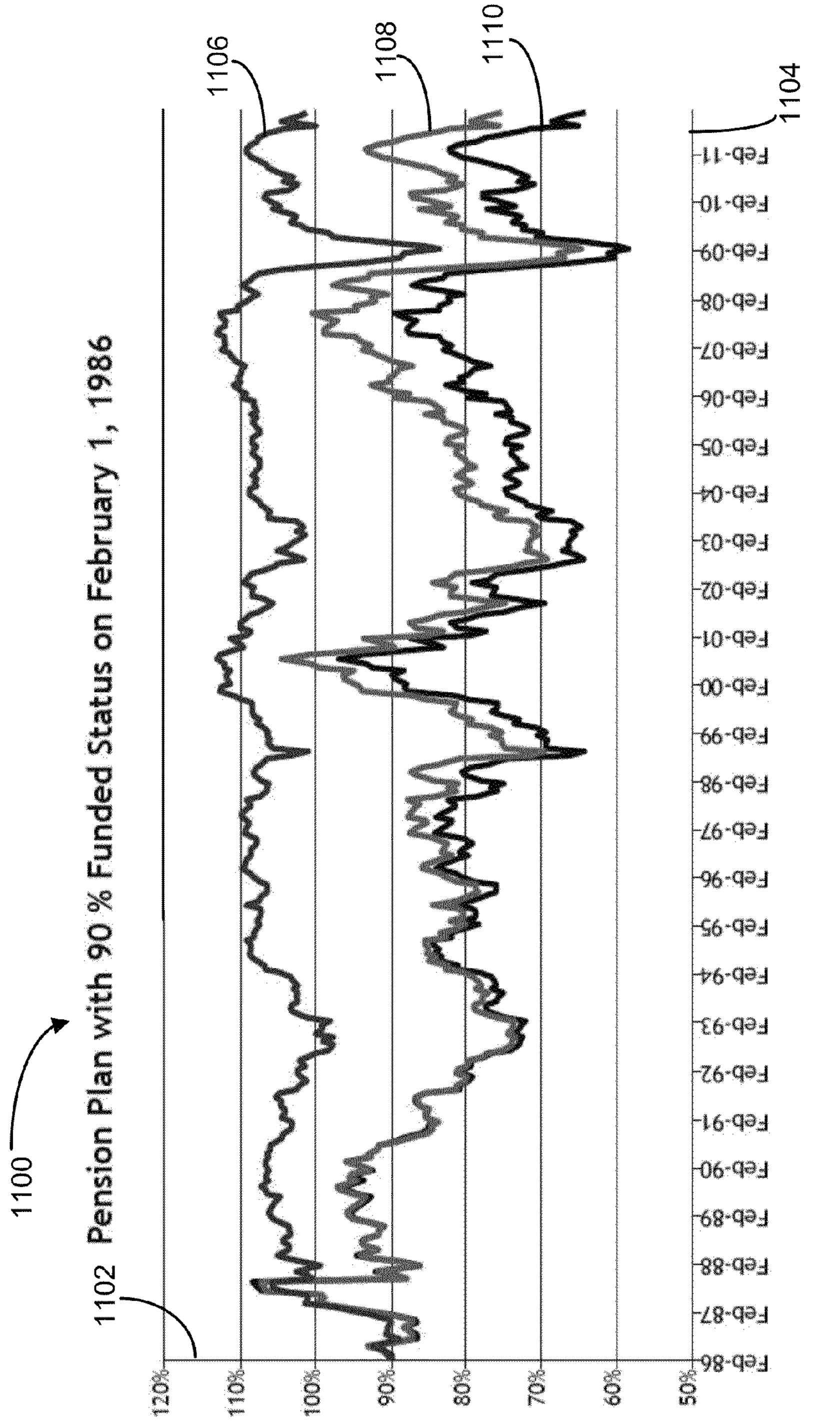
FIG. 11 is a chart illustrating a further back-testing example comparing the funded status 1102 over time 1104 for three funds which all start at 90% funded status.

FIG. 11 is a chart 1100 illustrating a further back-testing example comparing the funded status 1102 over time 1104 for three funds which all start at 90% funded status. It can be seen that the de-risking portfolio 1106 (for example, the 90% fund 904 of FIG. 9) has a significantly less volatile funded status than a 60/40 TSX/DEX long fund 1108 and a 60/40 TSX/DEX fund 1110. In this example, the plan sponsors would adjust/switch the portfolio among funds depending on funded status.

Figure 12:
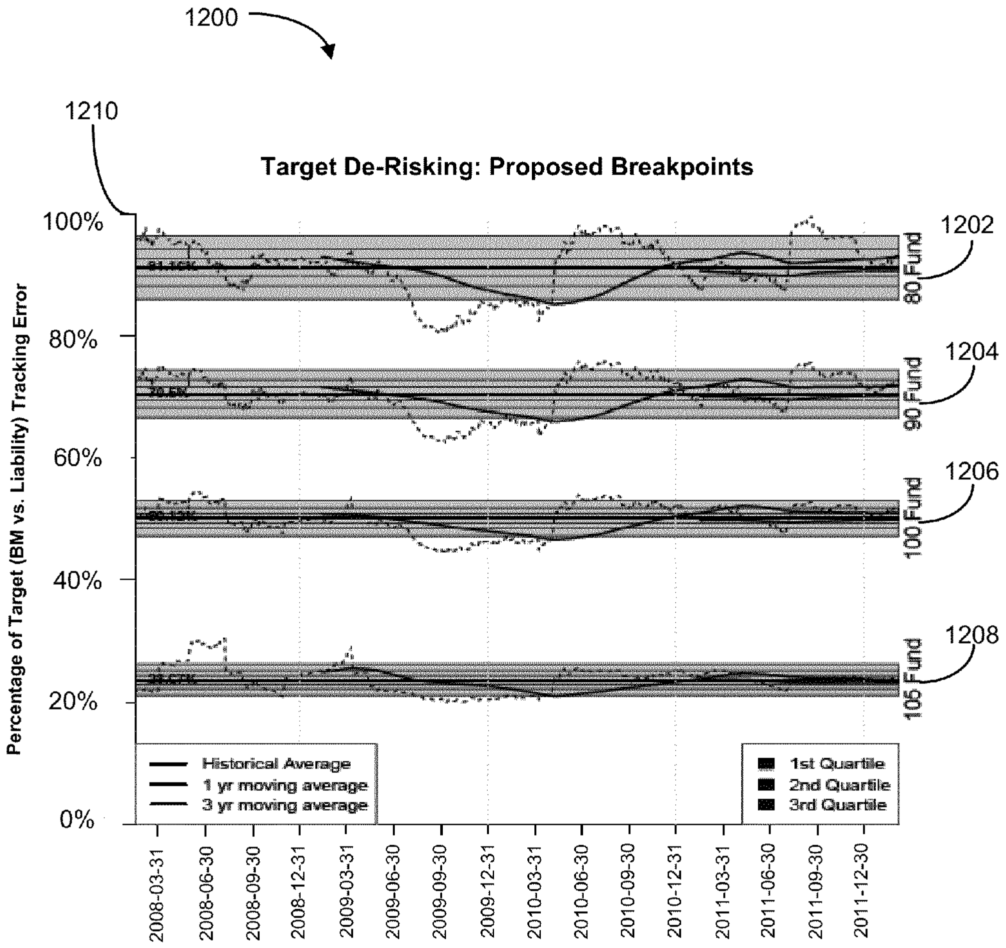
FIG. 12 illustrates target de-risking proposed breakpoints to be used in monitoring the de-risking portfolios.

FIG. 12 illustrates target de-risking proposed breakpoints 1200 to be used in monitoring the de-risking portfolios. Based on the back-testing noted above, target funded status volatility relative to a standard portfolio (e.g. a 60/40) is determined for each de-risking portfolio 1202, 1204, 1206, 1208. De-risking portfolios may be, for example, the de-risking portfolios of FIG. 9. The 80 fund 1202 target range is 91%+/−5%, The 90 fund 1204 target range is 71%+/−4%. The 100 fund 1206 target range is 50%+/−3%. The 105 fund 1028 target range is 24%+/−3%. The goal is to contain the relative funded status volatility tracking error 1210 within the predetermined ranges. The system manager 602 will monitor and make necessary asset allocation decisions given various financial factors such as, for example, current positioning, market environment, asset class outlooks, and the like. The decisions may include, for example, increasing/decreasing duration, adjusting the equity/fixed income mix, or the like in order to bring the portfolio back into the ranges specified.

Figure 13:
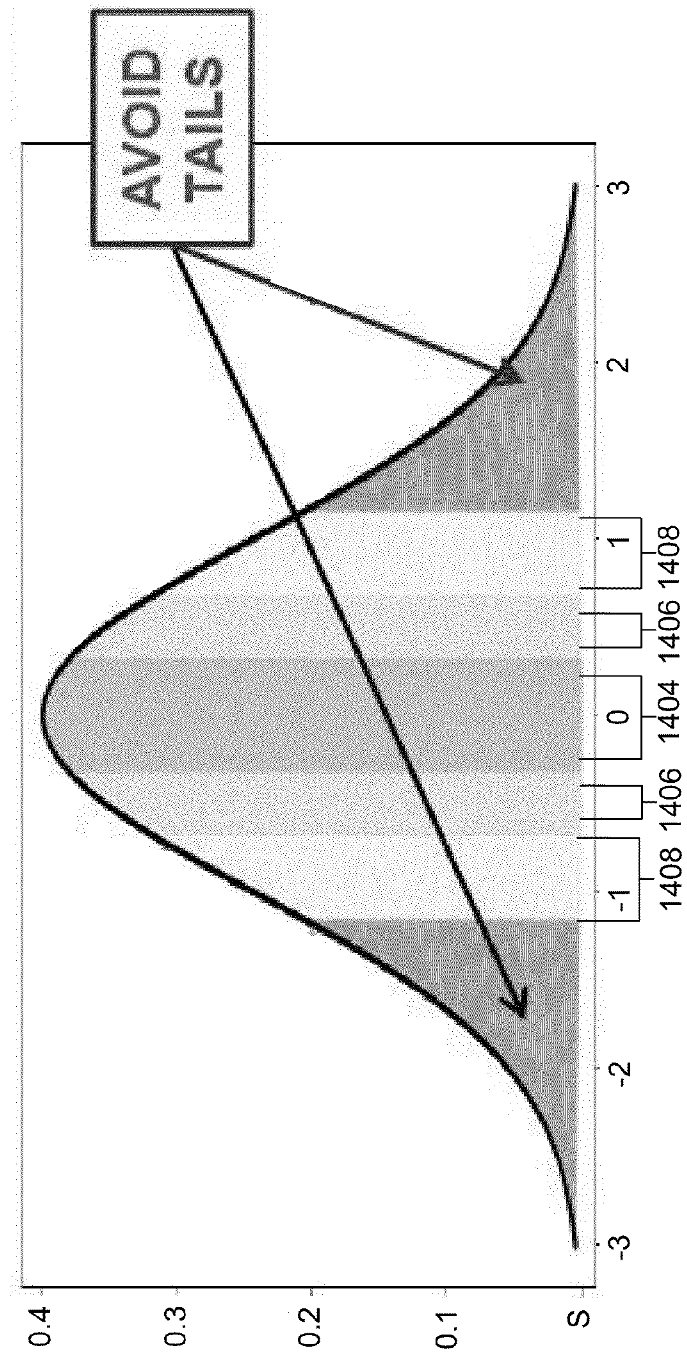
FIG. 13 shows standard deviation for a breakpoint.
Figure 14:
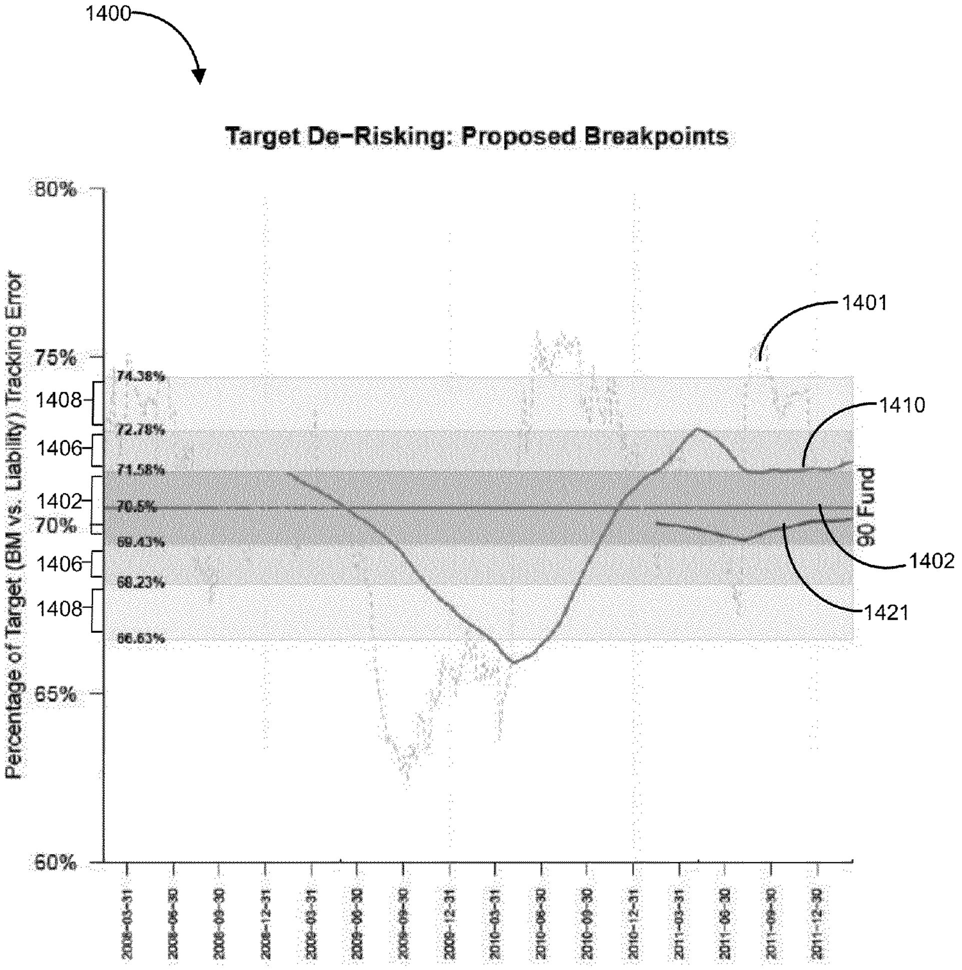
FIG. 14 is a graph showing target tracking error to illustrate a method for monitoring a de-risking portfolio.

FIG. 14 provides further detail of the breakpoints for a specific de-risking portfolio 1401 (for example, the 90% fund 904 of FIG. 9) and illustrates a method for monitoring the de-risking portfolio. The target range is 70.5%+/−4% based on the back-tested historical funded status volatility compared to a standard portfolio. The goal of the fund is to achieve the target range 1402. The funded status volatility can fluctuate within a first quartile 1404, a second quartile 1406, and a third quartile 1408. Quartiles 1404, 1406, 1408 are calculated from a curve such as the standard deviation curve of FIG. 13.

Funded status volatility is monitored on an absolute basis and a relative basis at predetermined intervals, for example, daily or at an appropriate frequency. Decisions are made by the system manager 602 as to what actions will be taken in order to decrease funded status volatility or improve the relative funded status volatility. The system manager 602 will attempt to maintain each fund's funded status volatility within their respective target ranges or benchmarks. In this way, the system managers 602 can be monitored against an appropriate benchmark for successful execution of their respective mandate. In one example, the system manager 602 may be considered successful if the one year moving average 1410 and three year moving average 1412 are within the target range.

Figure 15:
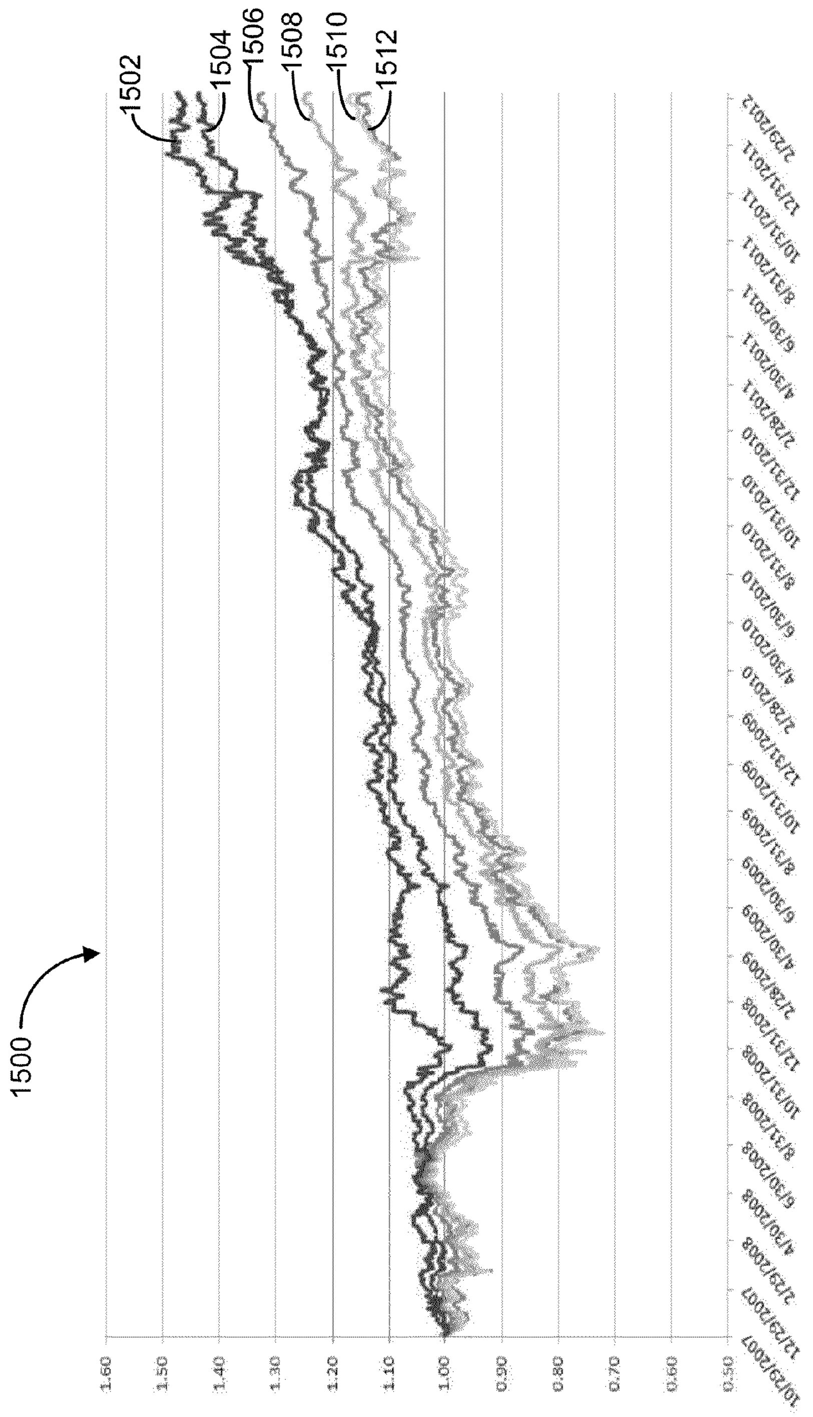
FIG. 15 illustrates asset and liability returns, in accordance with an embodiment.
Figure 16:
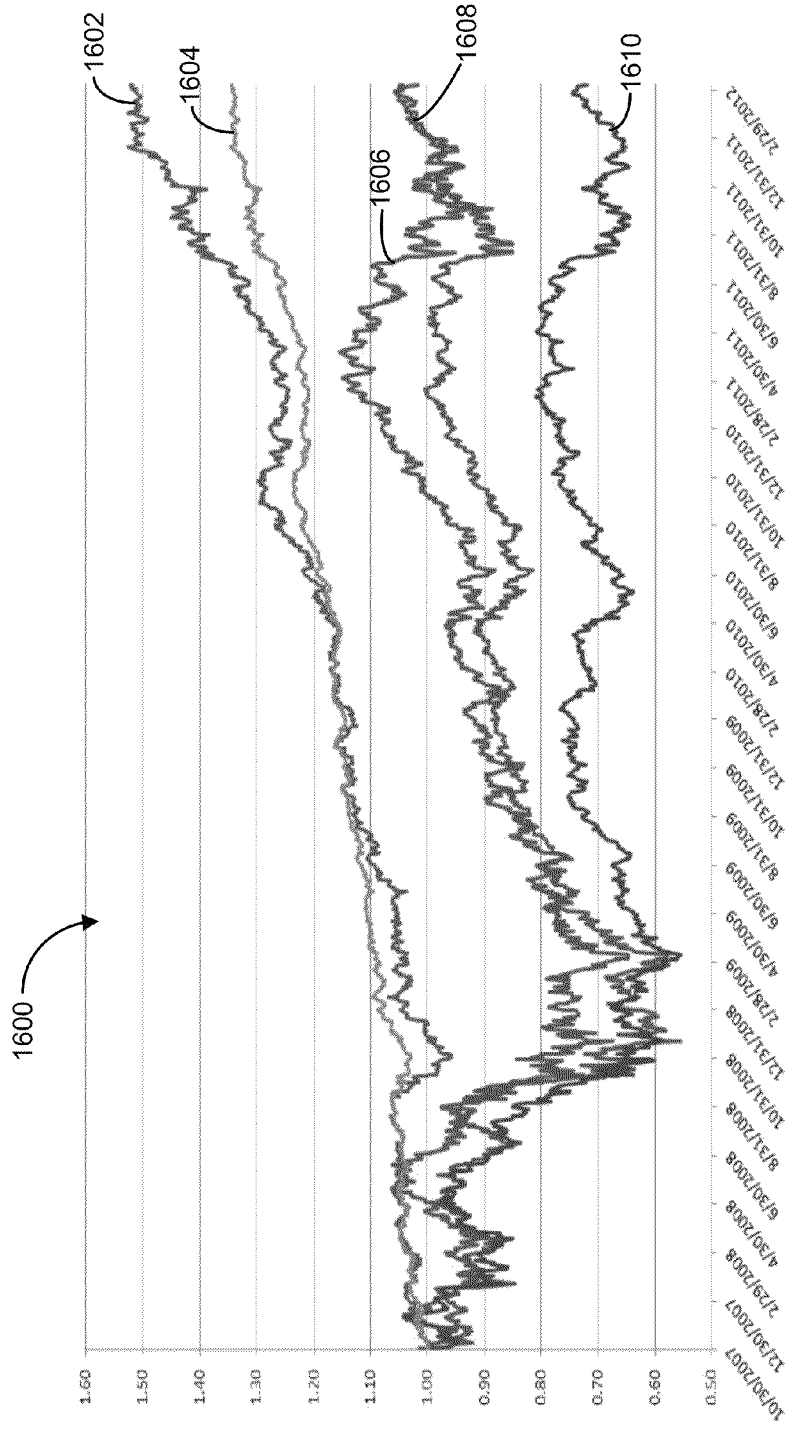
FIG. 16 illustrates underlying fund returns, in accordance with an embodiment.
Figure 17:
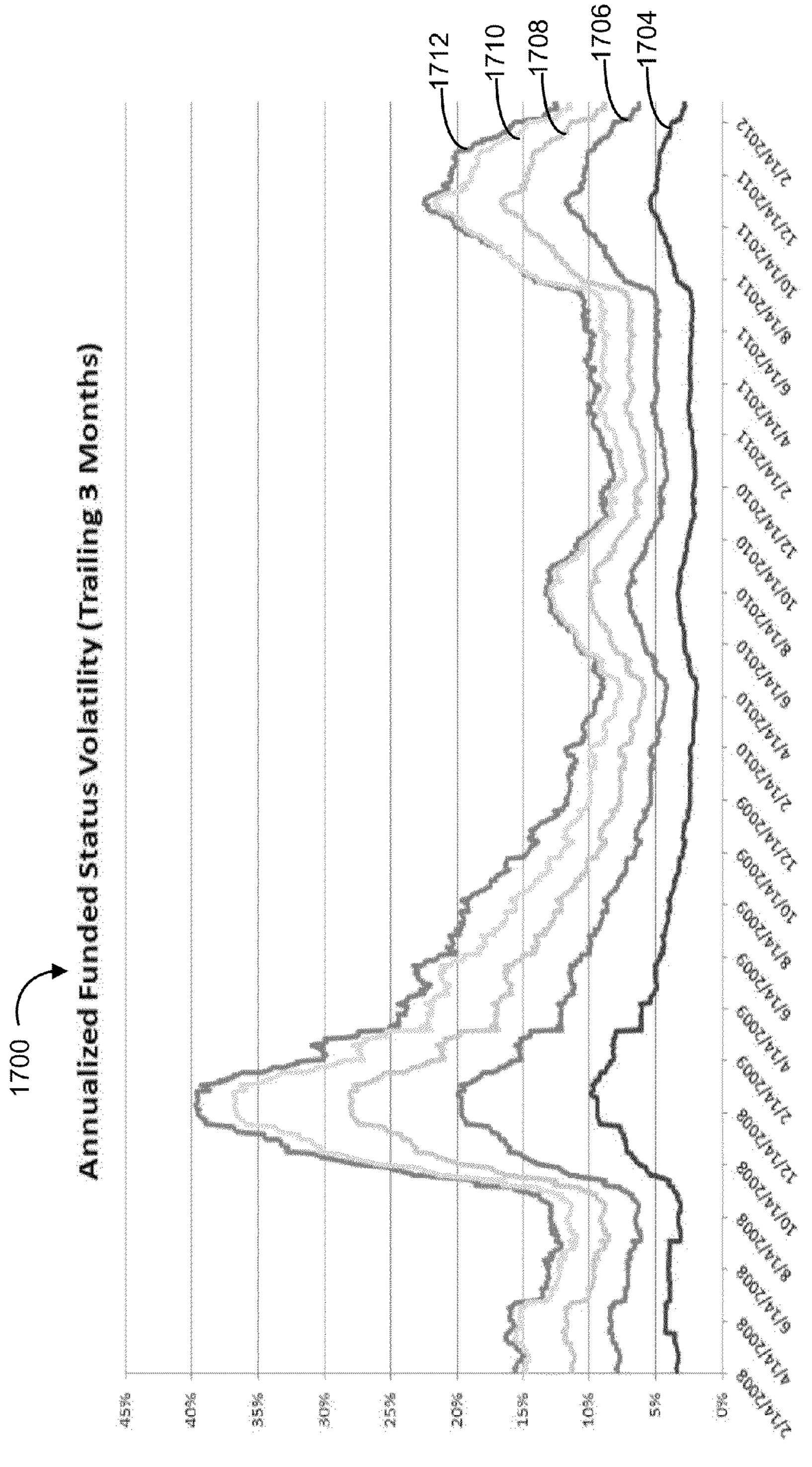
FIG. 17 illustrates historical funded status volatility, in accordance with an embodiment.

As further evidence of the potential for the systems and methods using the de-risking portfolios and benchmarks described above, the following graphs show additional back-testing results. FIG. 15 illustrates exemplary asset/liability returns 1500 from Oct. 30, 2007-Mar. 7, 2012 for various portfolios: a liability tracking portfolio 1502; the 105 fund 1504; the 100 fund 1506; the 90 fund 1508; the 80 fund 1510; and the traditional 60/40 fund 1512. FIG. 16 illustrates exemplary underlying fund returns 1600 from the same period for various conventional fund portfolios: long duration 1602, bond index 1604, Canadian Equity 1606, US Equity 1608, and International Equity 1610. Lastly, FIG. 17 illustrates exemplary historical funded status volatility 1700 for the same period for the de-risking portfolios: the 105 fund 1704, the 100 fund 1706, the 90 fund 1708, the 80 fund 1710, and the traditional 60/40 fund 1712. It can be seen that the systems and methods herein provide better liability tracking and reduced funded status volatility.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for de-risking a pension fund, the method comprising:
- receiving asset class forecasts from an input module;
- modeling a plurality of portfolios, via a modeling module, based on the asset class forecasts to determine a de-risking framework;
- determining asset mix for each of the model portfolios based on the de-risking framework; and
- periodically evaluating the model portfolios performance within the de-risking framework by, via a processor:
  - determining a funded status volatility measure for each model portfolio; and
  - comparing the funded status volatility measure of each model portfolio with a predetermined funded status volatility benchmark to determine whether each portfolio is within a target range; and
  - reporting results of the comparison.

2. A method according to claim 1 further comprising receiving historical data and back-testing the model portfolios against historical data via a back-testing module.

3. A method according to claim 1 wherein the plurality of portfolios comprises 10 or fewer portfolios.

4. A method according to claim 1 wherein the plurality of portfolios comprises 6 or fewer portfolios.

5. A method according to claim 1 wherein the plurality of portfolios comprises at least one portfolio for under-funded status and at least one portfolio for over-funded status.

6. A method according to claim 1 wherein the funded status volatility measure comprises a liability tracking error based on comparing the portfolio with a liability proxy.

7. A method according to claim 6 wherein the funded status volatility benchmark is the liability tracking error of a standard pension portfolio.

8. A method according to claim 1 wherein the de-risking framework comprises providing portfolios for a plurality of funded status levels.

9. A method according to claim 8 wherein the plurality of funded status levels comprise: 80%, 90%, 100% and 105% funded status.

10. A system for de-risking a pension fund, the system comprising:
- an input module for receiving asset class forecasts;
- a modeling module for modeling a plurality of portfolios based on the asset class forecasts to determine a de-risking framework;
- an asset mix module for receiving an asset mix for each of the model portfolios based on the de-risking framework;
- a database for storing data related to the asset class forecasts, the model portfolios, and asset mix;
- a processor configured to periodically evaluate the model portfolios performance within the de-risking framework by:
  - determining a funded status volatility measure of each model portfolio;
  - comparing the funded status volatility measure of each module with a predetermined funded status volatility benchmark to determine whether each portfolio is within a target range; and
  - reporting results of the comparison.

11. A system according to claim 10 further comprising a back-testing module for receiving historical data and back-testing the model portfolios based on the historical data.

12. A system according to claim 10 wherein the plurality of portfolios comprises 10 or fewer portfolios.

13. A system according to claim 10 wherein the plurality of portfolios comprises 6 or fewer portfolios.

14. A system according to claim 10 wherein the plurality of portfolios comprises at least one portfolio for under-funded status and at least one portfolio for over-funded status.

15. A system according to claim 10 wherein the funded status volatility measure comprises a liability tracking error based on comparing the portfolio with a liability proxy.

16. A system according to claim 15 wherein the funded status volatility benchmark is the liability tracking error of a standard pension portfolio.

17. A system according to claim 10 wherein the de-risking framework comprises providing portfolios for a plurality of funded status levels.

18. A system according to claim 17 wherein the plurality of funded status levels comprise: 80%, 90%, 100% and 105% funded status.

* * * * *